(12) United States Patent
Valente

(10) Patent No.: US 7,315,660 B2
(45) Date of Patent: Jan. 1, 2008

(54) REFINED QUADRILINEAR INTERPOLATION

(75) Inventor: Stephane Edouard Valente, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 687 days.

(21) Appl. No.: 10/477,888

(22) PCT Filed: May 21, 2002

(86) PCT No.: PCT/IB02/01819

§ 371 (c)(1),
(2), (4) Date: Nov. 19, 2003

(87) PCT Pub. No.: WO02/096112

PCT Pub. Date: Nov. 28, 2002

(65) Prior Publication Data

US 2004/0153816 A1    Aug. 5, 2004

(30) Foreign Application Priority Data

May 22, 2001 (FR) .................................. 01 06746

(51) Int. Cl.
*G06K 9/32* (2006.01)
*G03F 3/08* (2006.01)

(52) U.S. Cl. ...................................... 382/300; 358/525

(58) Field of Classification Search ........ 382/232–233, 382/263, 266, 274–275, 300, 312, 254; 358/525; 345/606

See application file for complete search history.

(56) References Cited

U.S. PATENT DOCUMENTS

| | | | |
|---|---|---|---|
| 6,697,126 B2 * | 2/2004 | Moni et al. | 348/616 |
| 7,110,947 B2 * | 9/2006 | Cox et al. | 704/236 |
| 2002/0133764 A1 * | 9/2002 | Wang | 714/707 |
| 2002/0157058 A1 * | 10/2002 | Ariel et al. | 714/774 |

OTHER PUBLICATIONS

"Multi-Directional Interpolation for Spatial Error Concealment" Wilson Kwok et al, IEEE Transactions on Consumer Electronics, IEEE vol. 39, No. 3, Aug. 1, 1993, p. 455-460.

"Temporal and Spatial Error Concealment Techniques for Hierarchical MPEG2 Video Codec" S. Aign et al, Proc. Globecom '95 oo, 1778-1783.

* cited by examiner

*Primary Examiner*—Kanjibhai Patel
(74) *Attorney, Agent, or Firm*—Larry Liberchuk

(57) ABSTRACT

A method of concealing error within a surface delimited by edges and containing points with which erroneous values are associated. A new value is interpolated for at least one point on the surface from interpolation points defined in a projection step by the projections in orthogonal directions of the point to be interpolated onto the edges of the surface. Primary distances are determined between the point to be interpolated and the interpolation points. The sums of the primary distances in each of the directions are calculated, the sums being called secondary distances. The interpolation step provides for determination of the new value of a point to be interpolated from the values associated with the respective interpolation points weighted by weights calculated according to the respective primary distances and second distances.

5 Claims, 2 Drawing Sheets

REFINED QUADRILINEAR INTERPOLATION

Figure 1:
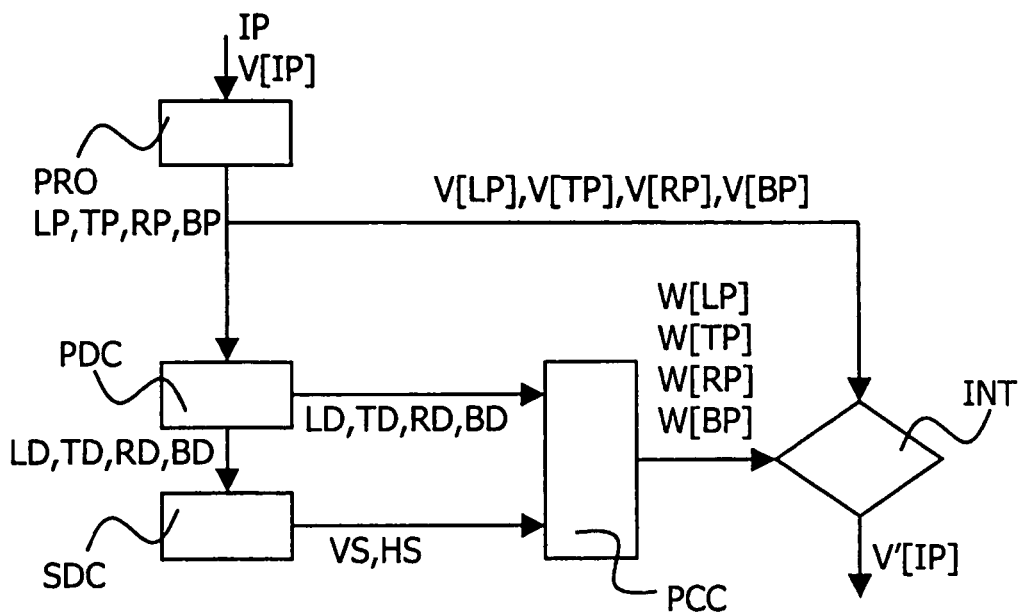

The invention relates to a method of concealing error within a surface delimited by edges and containing points with which erroneous values are associated, comprising:

a step of interpolating a new value for at least one point on the surface from interpolation points defined by the projections in orthogonal directions of the point to be interpolated onto the edges of the surface, a step of determining primary distances defined between the point to be interpolated and the interpolation points.

Such a concealment method is known from the document "Temporal and Spatial Error Concealment Techniques for Hierarchical MPEG-2 Video Codec", by Susanna Aign and Khaled Fazel in Proc. Globecom'95, pp. 1778-1783. The error concealment method presented in this document proposes to interpolate a new value of a point with which an erroneous value is associated, from values of interpolation points corresponding to projections in orthogonal directions of the point to be interpolated onto the edges of the error surface. The new value is obtained by weighting the value of each interpolation point by a distance between the point to be interpolated and the interpolation point opposite to said interpolation point in the projection direction. The distance is taken to be equal to zero if the opposite interpolation point does not exist. This error concealment method makes it possible to conceal the error surface without creating any discontinuity either within the error surface or on the edges of the error surface.

The invention relates to the following considerations:

The error concealment method presented in the prior art proposes to weight the value of each interpolation point in an egalitarian manner whatever the shape of the error surface. Thus the interpolation points corresponding to projections in a direction along which the error surface is the most extended will be weighted with greater weights than the interpolation points corresponding to projections in the other direction. This characteristic results in a poor-quality error concealment. For example, when the error surface is an image surface, the concealment obtained will be visually of poor quality. This poor quality is characteristic of the methods of concealing error by quadrilinear interpolation such as the ones disclosed in the cited document of the prior art.

One object of the invention is to improve the quality of the error concealment by quadrilinear interpolation.

In fact, an error concealment method according to the introductory paragraph is characterized according to the invention in that it includes a step of calculating sums of primary distances in each of the directions, said sums being called secondary distances, and in that the interpolation step is able to determine the new value of a point to be interpolated from values of the respective interpolation points weighted according to the respective primary distances and secondary distances.

The calculation of the sums of the distances between the point to be interpolated and each of the points corresponding to a projection of the point to be interpolated onto the edges of the surface, in each of the directions, makes it possible to know the geometry of the error surface and then to weight the interpolation points taking account of this geometry. Thus the values of the points are weighted so that the interpolation points which are closest to each other have a greater weight. A method according to the invention therefore makes it possible to rebalance the weights of the various points in the calculation of the new value of the point to be interpolated.

However, when a discontinuity between two adjacent points is present on one of the edges of the surface, the method according to the invention extends this discontinuity inside the surface by propagating the value of the two adjacent points inside the surface. This may result in a great deal of degradation of the quality of the error concealment.

Another object of the invention is to reduce the phenomenon of extension of the discontinuities inside the surface.

In an advantageous embodiment of the invention, the method is characterized in that the interpolation step is able to determine the new value of a point to be interpolated from averages of the values of respective sets of points situated close to the respective interpolation points and including the respective interpolation points, weighted according to the respective primary distances and secondary distances.

The object of this embodiment is to produce a kind of low-pass filter for the value of the interpolation points by eliminating the discontinuities which correspond to high frequencies.

The present invention can be implemented in any apparatus intended to process data within which there may be errors. In one of its applications, the invention therefore relates to a decoder intended to decode a bit stream comprising coded data of a digital image defined by a set of points characterized by parameters including a concealment module for implementing the method according to the invention.

The invention also relates to a computer program product intended to be executed by a processor used within a decoder for implementing the invention.

The invention will be further described with reference to examples of embodiments shown in the drawings to which, however, the invention is not restricted.

Figure 2:
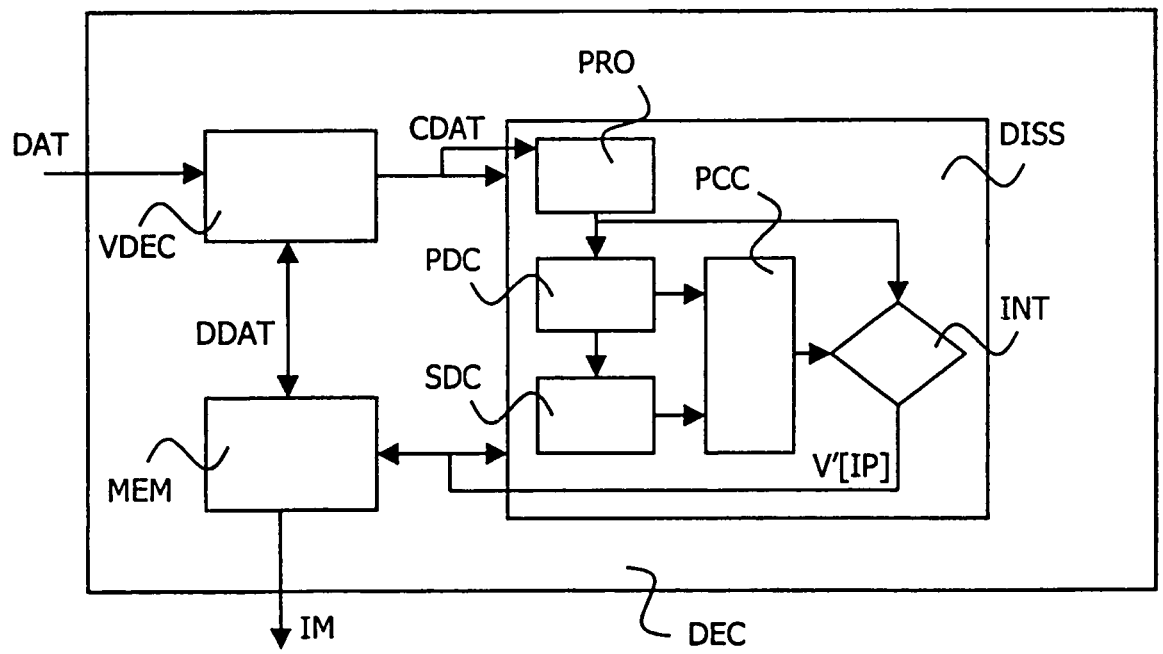
Figure 3:
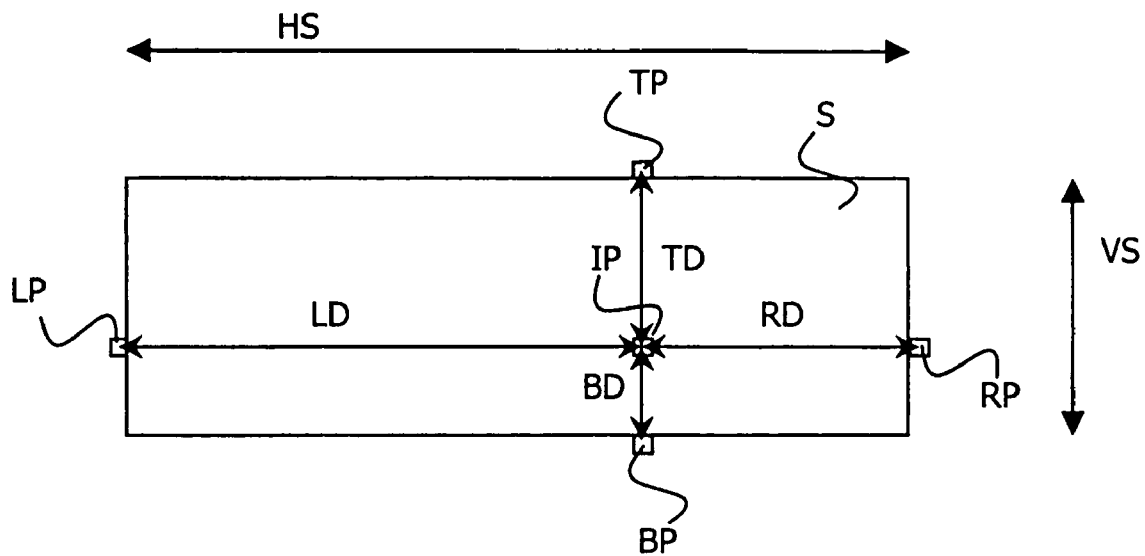
Figure 4:
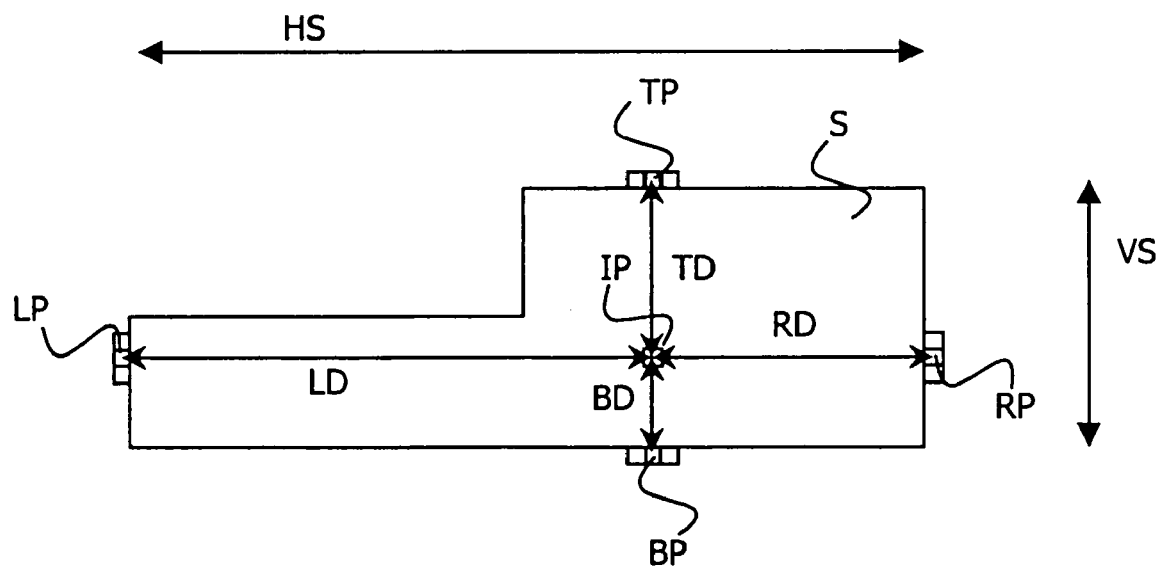

FIG. 1 is a functional diagram of an advantageous embodiment of the error concealment method according to the invention, FIG. 2 is a schematic representation of an apparatus according to the invention, FIG. 3 is a schematic illustration of the functioning of a method according to a first embodiment of the invention, FIG. 4 is a schematic illustration of the functioning of a method according to a second embodiment of the invention.

The following description is presented to enable a person skilled in the art to implement and make use of the invention. This description is provided in the context of the patent application and its requirements. Various alternatives to the preferred embodiment will be obvious to a person skilled in the art and the generic principles of the invention disclosed here can be applied to other embodiments. Thus the present invention is not deemed to be limited to the embodiment described but rather to have the broadest scope in agreement with the principles and characters described below.

FIG. 1 shows a functional diagram of a method according to the invention. Said method receives as an input the coordinates of a point to be interpolated IP as well as the value of said point V[IP]. To illustrate the method, FIG. 3 presents visually on a surface S the various steps of the method according to the invention. In FIG. 3, a point IP is situated within an error surface S for which at least one point to be interpolated IP is associated with an erroneous value. Said value may be detected as being erroneous or as being absent. The absence of data will in particular be observed for the data transmission errors within a digital image data stream. The functioning of the invention is concerned only with points detected as having to be interpolated without being preoccupied with knowing whether or not a value was already associated with these points. Referring to FIG. 1, a first step PRO projects the point to be interpolated IP in orthogonal directions of the point to be interpolated onto the edges of the error surface. Each result point of the projections is an interpolation point LP, TP, RP, BP. These interpolation points are illustrated in FIG. 3. In addition to the position of the interpolation points, knowledge of these interpolation points makes it possible to know the value of these points V[LP], V[TP], V[RP], V[BP]. In a step PDC, the positions of the interpolation points make it possible to determine primary distances LD, TD, RD, BD for each interpolation point LP, TP, RP, BP. Each primary distance is taken to be zero if the opposite interpolation point does not exist. Each primary distance corresponds to the distance between the point to be interpolated IP and the interpolation point. A step SDC then calculates secondary distances VS and HS which, in the preferred embodiment of the invention, are the sums of the primary distances in each of the directions. Referring to FIG. 3, the primary distances LD, TD, RD, BD are depicted as well as the secondary distances HS and VS.

The document of the prior art cited proposes a calculation of weights using only the primary distances. The weights associated with each interpolation point are:

$$W[LP] = \frac{RD}{LD+TD+RD+BD},$$
$$W[TP] = \frac{BD}{LD+TD+RD+BD},$$
$$W[RP] = \frac{LD}{LD+TD+RD+BD},$$
$$W[BP] = \frac{TD}{LD+TD+RD+BD}.$$

The interpolation points corresponding to projections in a direction in which the error surface is the most extended are weighted with greater weights than the interpolation points corresponding to projections in the other direction. This does not afford good interpolation as soon as a non-square surface is observed and this results in an error concealment of poor quality.

The invention sets out to reduce these problems by observing the secondary distances HS and VS. Within a step PCC, the method therefore calculates the weights which will be allocated to each interpolation point value according to the primary distances and secondary distances. When the secondary distance HS is greater than the secondary distance VS, this means that the interpolation points TP and BP are closer to the point IP than the points LP and RP. The weights corresponding to the points TP and BP are for example increased according to the invention whilst the weights corresponding to the points LP and RP are left unchanged. Conversely, when the secondary distance VS is greater than the secondary distance HS, the weights corresponding to the points LP and RP are for example increased according to the invention whilst the weights corresponding to the points TP and BP are left unchanged. The modification of the weights can advantageously be calculated according to the distances HS and VS. The weights allocated to the interpolation points can thus be for example:

$$W[LP] = \frac{RD \times VS^2}{LD \times VS^2 + TD \times HS^2 + RD \times VS^2 + BD \times HS^2},$$
$$W[TP] = \frac{BD \times HS^2}{LD \times VS^2 + TD \times HS^2 + RD \times VS^2 + BD \times HS^2},$$
$$W[RP] = \frac{LD \times VS^2}{LD \times VS^2 + TD \times HS^2 + RD \times VS^2 + BD \times HS^2},$$
$$W[BP] = \frac{TD \times HS^2}{LD \times VS^2 + TD \times HS^2 + RD \times VS^2 + BD \times HS^2}.$$

Using such a weighting, the weights are increased for the interpolation points for which the distance from the surface is the smallest and decreased for the interpolation points for which the distance from the surface is the largest.

These weights and the values of the interpolation points V[LP], V[TP], V[RP], V[BP] are the inputs of an interpolation step INT which calculates a new value V'[IP] according to these input data.

The calculation is as follows:

$$V'[IP]=W[LP]\times V[LP]+W[TP]\times V[TP]+W[RP]\times V[RP]+W[BP]\times V[BP]$$

A method according to the invention therefore makes it possible to rebalance the weights of the different points in the calculation of the new value of the point to be interpolated V'[IP].

However, when a discontinuity between two adjacent points is present on one of the edges of the surface, the method according to the invention extends this discontinuity inside the surface by propagation on the value of the two adjacent points for the errors present inside the surface. This is because two adjacent interpolation points on an edge of the surface have very different values each serving for the interpolation of all the points situated on a line of the surface. The two adjacent lines will then each have values close to those of the corresponding interpolation points. This will result in considerable degradation in the quality of the error concealment.

Another purpose of the invention is thus to reduce the phenomenon of extension of the parasitic discontinuities within the surface.

In an advantageous embodiment of the invention depicted schematically in FIG. 4, the interpolation step INT is able to determine the new value of a point to be interpolated from the averages of the values of respective sets of points situated close to the respective interpolation points and including the respective interpolation points, weighted according to the respective primary distances and secondary distances. Referring to FIG. 4, which illustrates a particular embodiment, the points adjacent to the interpolation points LP, TP, RP, BP are used for evaluating the new value of the point to be interpolated IP. In this example, the mean of the values of three points including the two points adjacent to each interpolation point and the interpolation point is calculated. This calculation can be carried out during a particular step after the step of projecting the point to be interpolated onto the edges of the surface. The mean of the values is then used in the interpolation step in place of the simple values V[LP], V[TP], V[RP], V[BP]. This way of proceeding amounts to applying a low-pass filter to the interpolation points in order to avoid the propagation of high frequencies inside the surface.

FIG. 2 depicts schematically a decoder DEC, intended to decode a bit stream comprising coded data DAT of a digital image defined by a set of points defined by values, in which a method according to the invention is implemented. The data can be received through any known transmission means and may contain errors. The decoder depicted includes a video decoding module VDEC which decodes the valid data DDAT and detects the corrupted data CDAT. The valid data are conventionally stored in a memory module MEM. An error concealment module DISS is connected to the decoding module and receives the corrupted data CDAT. Some of these data are intended to be in particular concealed by an error concealment method according to the invention. The concealment module DISS thus includes a projection module PRO able to determine the interpolation points and their respective values. Modules PDC and SDC then calculate the primary and secondary distances according to the calculations set out above in order to send them as an input of a module PCC for calculating the weightings of the different values of the interpolation points. The interpolation of the new value is carried out within an interpolation module INT. The new value of the point V'[IP] is then stored in a memory module so as to be used within the reconstructed image IM.

The modules presented for performing the functions presented in the steps of the method according to the invention can be integrated as an additional application in a conventional decoder or be used in an independent error concealment module intended to be connected to a conventional decoder for performing the functions according to the invention.

There are many ways of implementing the functions presented in the steps of the methods according to the invention by software and/or hardware means accessible to persons skilled in the art. This is why the figures are schematic. Thus, although the figures show different functions performed by different units, this does not exclude a single software and/or hardware means making it possible to perform several functions. Nor does this exclude a combination of software and/or hardware means making it possible to perform a function.

Although this invention has been described in accordance with the embodiments presented, a person skilled in the art will immediately recognize that there are variants to the embodiments presented and that such variants remain within the spirit and within the scope of the present invention. Thus many modifications can be made by a person skilled in the art without for all that being excluded from the spirit and scope defined by the following claims.

The invention claimed is:

1. A method for automatic error concealment in an edge-delimited surface on a digital image and containing points with which erroneous values are associated, comprising:
   a step of interpolating a new value for at least one point on the surface from interpolation points defined projections in orthogonal directions of the point to be interpolated onto the edges of the surface,
   a step of determining primary distances defined between the point to be interpolated and the interpolation points, characterized in that it includes:
   a step of calculating the sums of the primary distances in each of the directions, said sums being called secondary distances, and in that
   the interpolation step is able to determine the new value of a point to be interpolated from the values associated with the respective interpolation points weighted according to the respective primary distances and secondary distances.

2. A concealment method as claimed in claim 1, characterized in that the interpolation step is able to determine the new value of a point to be interpolated from the averages of the values associated with points situated in the vicinity of the interpolation points and at the respective interpolation points, weighted according to the respective primary distance and secondary distances.

3. A decoder intended to decode a bit stream comprising coded data of a digital image defined by a set of points with which values are associated in which said bit stream may include errors resulting from the presence of an edge-delimited surface on the digital image containing points with which erroneous values are associated, said decoder including an error concealment module in an edge-delimited surface on the digital image, said concealment module including:
   interpolation means for a new value for at least one point of the surface from interpolation points defined by the projections in orthogonal directions to the point to be interpolated on the edges of the surface,
   means for determining primary distances defined between the point to be interpolated and the interpolation points, characterized in that it includes:
   calculation means for calculating sums of the primary distances in each of the directions, said sums being called secondary distances, and in that
   the interpolation means are suitable for determining the new value of a point to be interpolated from values associated with the respective interpolation points weighted as a function of the primary distances and secondary distances, respectively.

4. A decoder as claimed in claim 3, characterized in that the interpolation means are capable of determining a new value of a point to be interpolated front average values associated with points situated in the of respective interpolation, points and at the respective interpolation points, weighted as a function of the primary distances and secondary distances, respectively.

5. A computer readable storage medium for storing a program to be executed by a processor program comprising instructions for automatically concealing an error in an edge-delimited surface on a digital image containing points with which erroneous values are associated, comprising:
   interpolating a new value for at least one point on the surface from interpolate points defined by the projections in orthogonal directions of the point to be interpolated onto the edges of the surface;
   determining primary distances defined between the point to be interpolated and the interpolation points; and
   calculating the sums of the primary distances in each of the directions, said sums being called secondary distances, such that the new value of a point to be interpolated is determined from the values associated with the respective interpolation points weighted according to the respective primary distances and secondary distances.

* * * * *